(12) United States Patent
Jandaud et al.

(10) Patent No.: US 11,940,308 B2
(45) Date of Patent: Mar. 26, 2024

(54) INSERT FORMING AN ULTRASONIC CHANNEL FOR A FLUID METER AND INCLUDING REFLECTOR MIRRORS AND A FLOW STABILIZER

(71) Applicant: Itron Global SARL, Liberty Lake, WA (US)

(72) Inventors: Pierre-Olivier Jandaud, Macon (FR); Soufiane Zbidi, Macon (FR); Clara Lefaucheux, Macon (FR); Jeremy Masson, Macon (FR); Leo Meyer, Macon (FR); Abdel-Hakim Elattar, Macon (FR)

(73) Assignee: ITRON GLOBAL SARL, Liberty Lake, WA (US)

( * ) Notice: Subject to any disclaimer, the term of this patent is extended or adjusted under 35 U.S.C. 154(b) by 268 days.

(21) Appl. No.: 17/487,599

(22) Filed: Sep. 28, 2021

(65) Prior Publication Data
US 2022/0178728 A1 Jun. 9, 2022

Related U.S. Application Data

(60) Provisional application No. 63/121,886, filed on Dec. 5, 2020.

(51) Int. Cl.
*G01F 1/66* (2022.01)
*G01F 1/663* (2022.01)
*G01F 1/667* (2022.01)

(52) U.S. Cl.
CPC .............. *G01F 1/663* (2013.01); *G01F 1/662* (2013.01); *G01F 1/667* (2013.01)

(58) Field of Classification Search
None
See application file for complete search history.

(56) References Cited

U.S. PATENT DOCUMENTS

| 6,051,144 A * | 4/2000 | Clack ................... B01D 35/143 96/417 |
| 6,516,675 B1 * | 2/2003 | Jan ........................ G01F 1/662 73/861.63 |
| 2008/0190214 A1 * | 8/2008 | Ubowski .................. G01F 1/10 29/889.22 |

FOREIGN PATENT DOCUMENTS

| CN | 103983312 A | 8/2014 |
| EP | 1775560 A2 | 4/2007 |

(Continued)

OTHER PUBLICATIONS

The International Search Report and Written Opinion for PCT Application No. PCT/US21/61173, dated Mar. 22, 2022.

*Primary Examiner* — Harshad R Patel
(74) *Attorney, Agent, or Firm* — Lee & Hayes P.C.

(57) ABSTRACT

Techniques are disclosed for promoting more desirable fluid flow within a section of pipe between upstream and downstream transducers in a fluid meter (e.g., a water or gas meter). To create better fluid flow characteristics, an insert may be installed within the section of pipe. The insert may be configured with an upper portion and a lower portion that are connected in the manufacturing process. The insert may include mirror supports configured to result in low pressure drop and stable flow conditions. The mirror supports (upstream and downstream) reflect the ultrasonic signals sent between the upstream and downstream piezo transducers. A fluid stabilizer may be connected to one of the upper portion or the lower portion of the insert. The fluid stabilizer may include a conical central portion and four blades to smooth fluid flow between the transducers and associated mirrors.

17 Claims, 10 Drawing Sheets

(56) References Cited

FOREIGN PATENT DOCUMENTS

| EP | 3677877 A1 | 7/2020 | | |
| WO | WO-2018121134 A1 | * | 7/2018 | ............. G01F 1/662 |

* cited by examiner

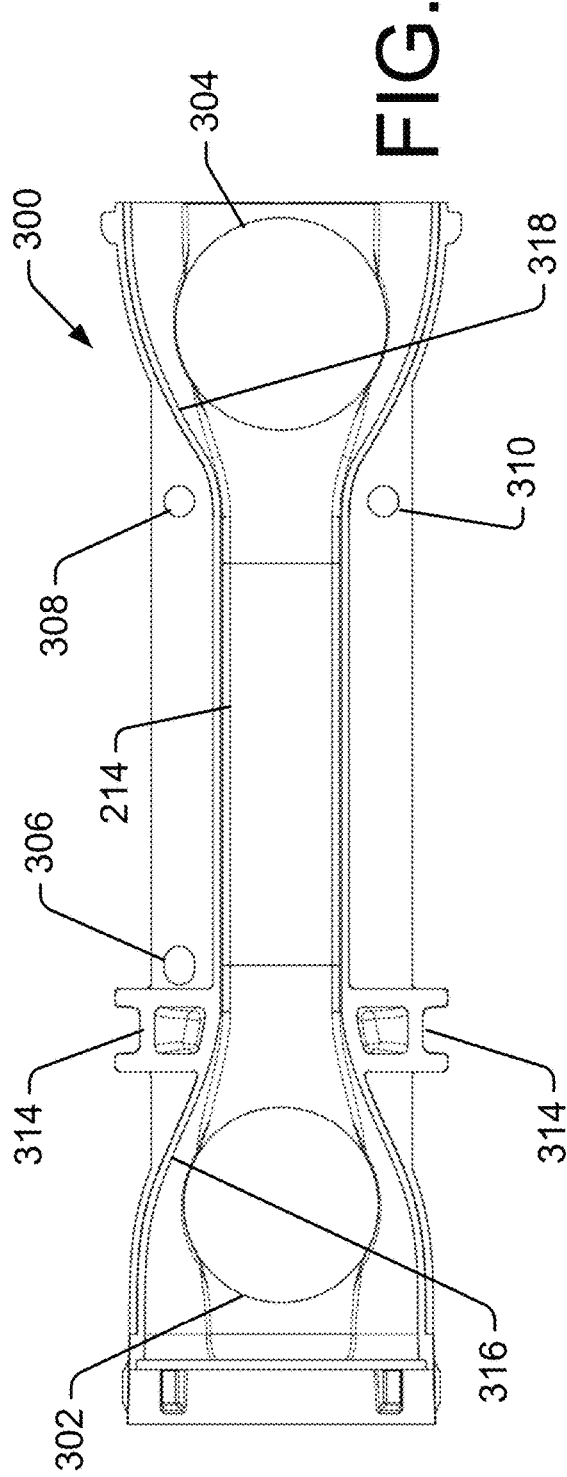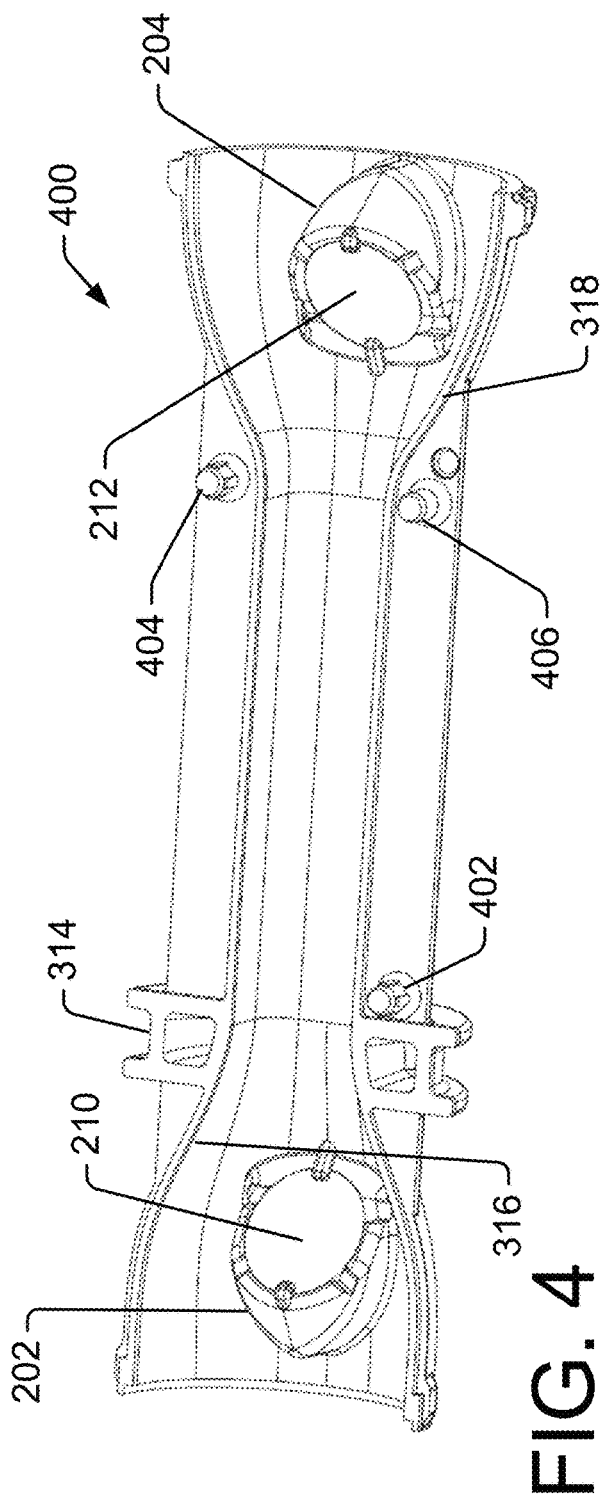

INSERT FORMING AN ULTRASONIC CHANNEL FOR A FLUID METER AND INCLUDING REFLECTOR MIRRORS AND A FLOW STABILIZER

RELATED APPLICATIONS

This patent application claims benefit of priority to U.S. provisional application Ser. No. 63/121,886, titled "Ultrasonic Channel", filed on 5 Dec. 2020, which is incorporated herein by reference.

BACKGROUND

Known metering devices (e.g., a water meter owned by a utility company and located at a customer site) use ultrasonic transducers to measure fluid flowrate and/or fluid quantity. In an example, a signal is sent from an upstream transducer to a downstream transducer, and a time-of-flight (TOF) is recorded. A similar signal is sent by the downstream transducer to the upstream transducer, and the TOF is recorded. The flowrate can then be determined by comparing the two TOF values. However, the accurate measurement of fluid quantity depends in part on characteristics of the fluid flow. In an example, a fluid flow having inconsistent and/or non-laminar characteristics may be more difficult to accurately measure. Unfortunately, it is difficult to create a consistent fluid flow (e.g., water or gas) in a metering device.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIG. 3 is a rendering showing an example upper portion of an insert for a section of pipe within which fluid flow is measured.

FIG. 4 is a rendering showing an example lower portion of an insert for a section of pipe within which fluid flow is measured.

DETAILED DESCRIPTION

Overview

Figure 8:
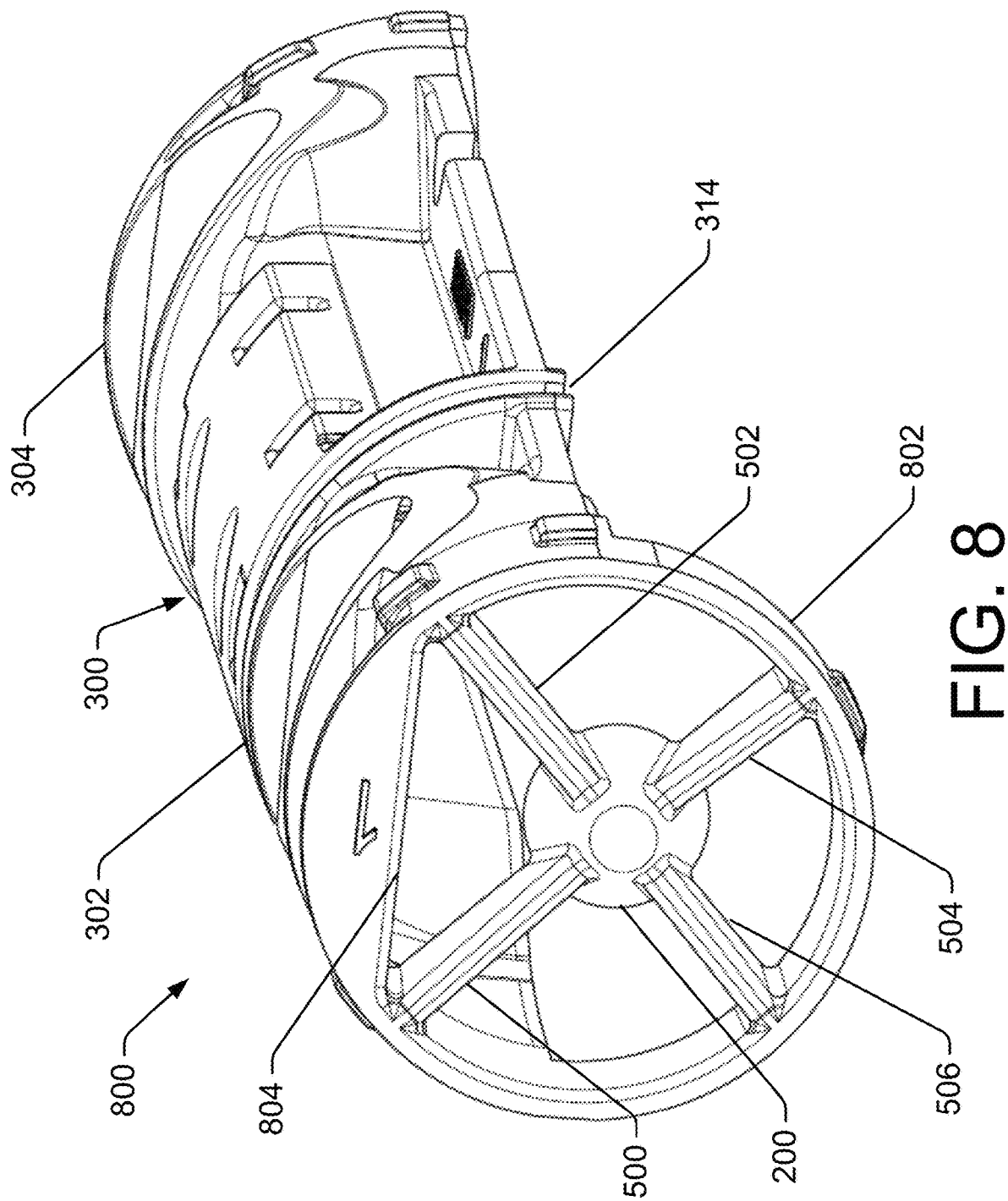
FIG. 8 is a rendering showing a flow stabilizer of a top or upper portion of an example insert.

The disclosure describes aspects of fluid (particularly water, but in some examples natural gas) measurement. An example transducer assembly may be configured to send signals between upstream and downstream transducers, and to measure a flowrate as a function of a difference in the upstream and downstream signal time-of-flight. The transducers may be located in a section of pipe. To create better fluid flow characteristics, an insert is installed within the section of pipe. The insert may include one or more features to guide fluid (water, gas, etc.) to create a more laminar, smooth, and/or predictable flow pattern that results in more accurate fluid flowrate and/or quantity measurements. An example feature of the insert may include optimized mirror supports for low pressure drop and stable flow conditions. The mirror supports (upstream and downstream) reflect the ultrasonic (e.g., acoustic) signals sent between the upstream and downstream transducers. The optimized mirror supports have a shape that conducts fluid in a manner that reduces turbulence and promotes more stable and/or laminar flow conditions. Another example feature of the insert is an optimized curve that transitions the insert between areas of greater and lesser diameter. A further example feature of the insert is a flow stabilizer. In an example, the flow stabilizer may have four fins or blades configured in a "plus sign" shape (e.g., as seen in FIG. 8) that tend to reduce fluid swirl and to promote a reproducible and/or consistent flow. A conic shape at the intersection of the blades smooths and stabilizes the fluid flow

Example Metering Devices

For metering devices (e.g., water meters at a customer's site), robustness is an important issue. There are at least two types of robustness. Robustness that results in favorable installations of metering devices despite potentially adverse conditions is a first type of robustness. Such robustness includes systems, techniques and/or components that reduce or eliminate damage of meters in storage, transportation, installation, and/or activation. In a first example, meters are calibrated in ideal conditions. Performance of the meters in "the field" (i.e., installed at a customer location or tested at a customer test bench) must equal, or be nearly equal to the results achieved under ideal conditions. In a second example, pressure drop of the meter should be below a threshold value based on a design or device requirement specification when installed at the customer site.

A second type of robustness involves adherence to high manufacturing standards. Meters manufactured using techniques of mass production should be nearly identical. Variance in manufacturing may result in variances in performance in the field. Accordingly, production of nearly identical meters will promote and result in metrology having good reproducibility and/or accuracy in utility company testing, certification, and/or metering at utility customer sites. In an example of a potential manufacturing problem, meters having a lot of different independent parts may be more difficult to manufacture accurately.

In an example, a high level of metrology robustness, may be achieved using an insert to create an ultrasonic channel within a pipe through which water flows, as it passes through the meter. For metrology robustness against inlet flow conditions, example features include: a W-shaped ultrasonic architecture (described with reference to FIG. 2B) which allows a better integration of the flow. In another example of metrology robustness, optimized shapes may be used in the insert, and made using fluid dynamics simulations. In another example of metrology robustness, a flow stabilizer (e.g., the flow stabilizer 800 of FIG. 8), may be used to remove swirl effects without impacting the overall flow. The flow stabilizer may be molded as part of the insert (e.g., the insert 112 of FIG. 1). At least two significant advantages result from the stabilizer molded as part of the insert. First, a plurality of such inserts with stabilizer will result in a plurality of meters that consistently and accurately measure the same gas flow. In an example, meters configured in series would indicate the same flowrate of gas. Secondly, each insert having a stabilizer has consistent flow characteristics over time. That is, a same flowrate is measured to result in the same measured flowrate.

Figure 2A:
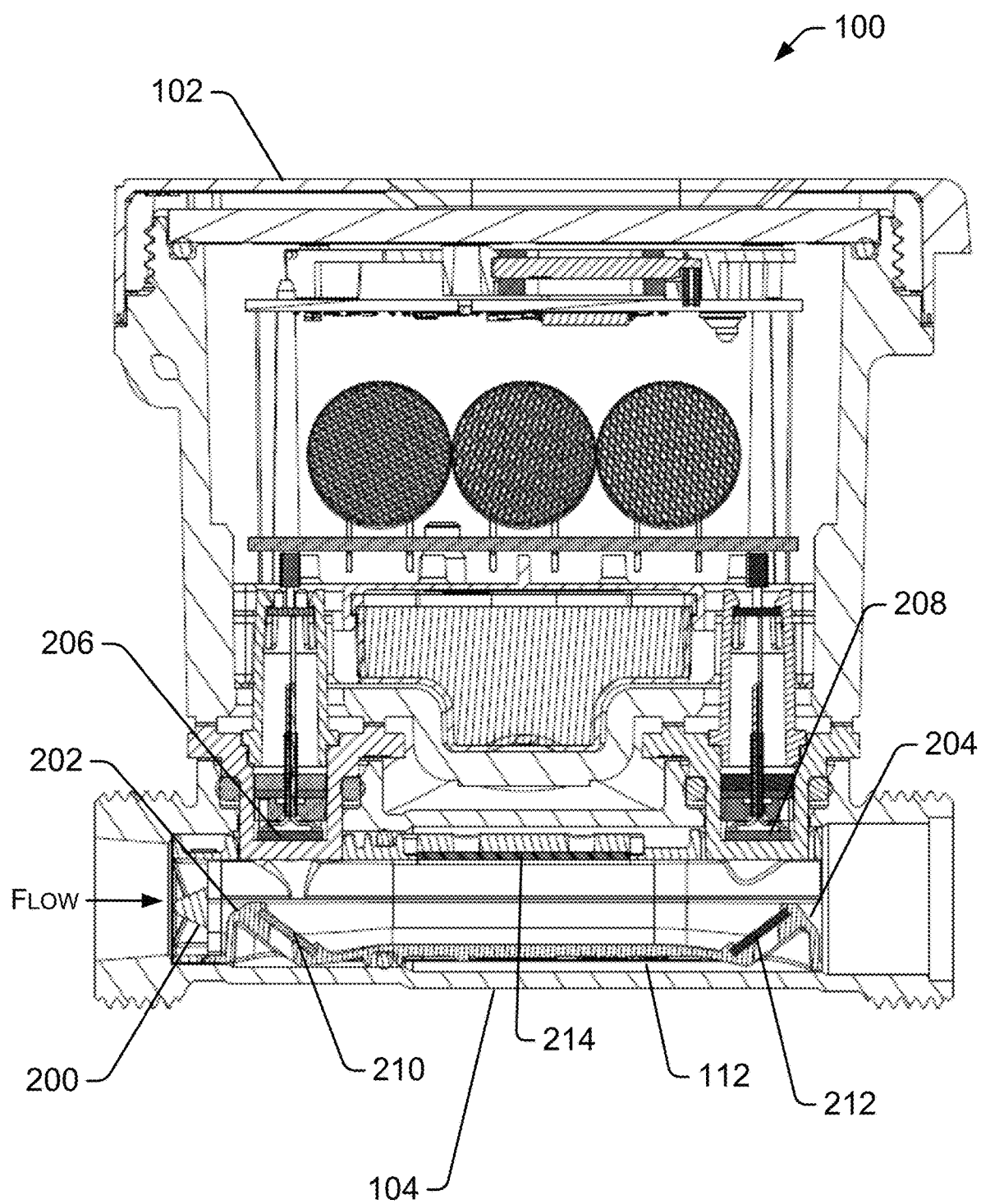
FIGS. 2A and 2B are renderings of an example cross-sectional view of a water meter, showing the insert portion installed within the section of pipe.
Figure 2B:
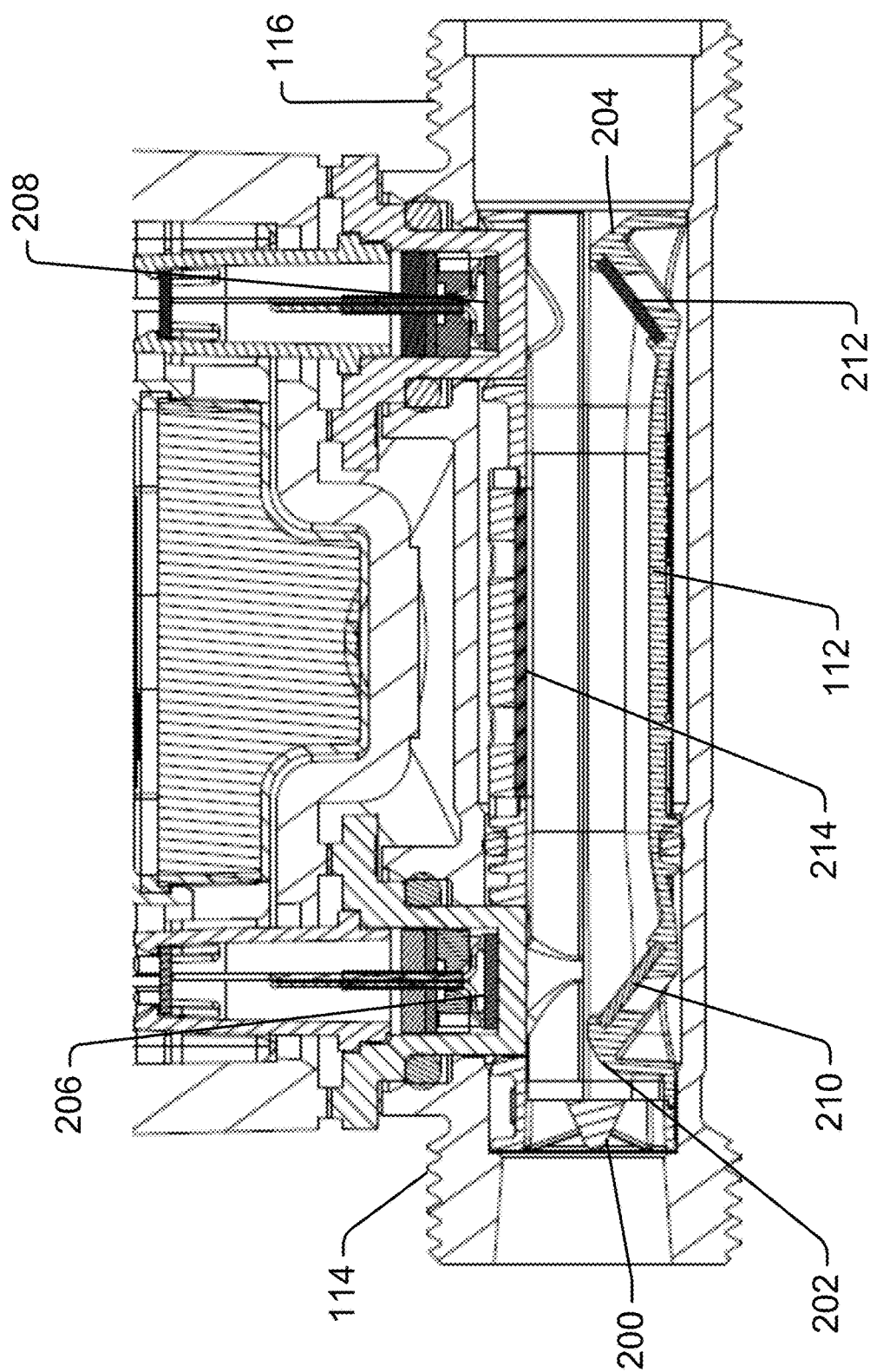

Robustness in mass production, may include additional features. In an example of robustness in mass production, a metrological channel may be made of only two parts (e.g., upper and lower insert). By reducing the parts count, more consistent quality may be achieved in production. In another example of robustness in mass production, a position of the insert is locked by the transducers of the register or metering device. Referring to FIG. 2A, the transducers 206, 208 extend through holes in the insert (e.g., holes 302, 304 of FIG. 3), thereby locking the relative positions of the transducers and the insert 112 (e.g., as seen in FIGS. 2A and 2B). While holes are shown in the example of FIG. 3, the holes may be replaced by or combined with connectors to hold the transducers in precise locations.

In another example of robustness in mass production, a flow stabilizer is directly molded into the upper portion (or alternatively, the lower portion) of the insert. In the example of FIG. 8, the flow stabilizer 800 is molded into the upper portion 300 of the insert 112.

Figure 1:
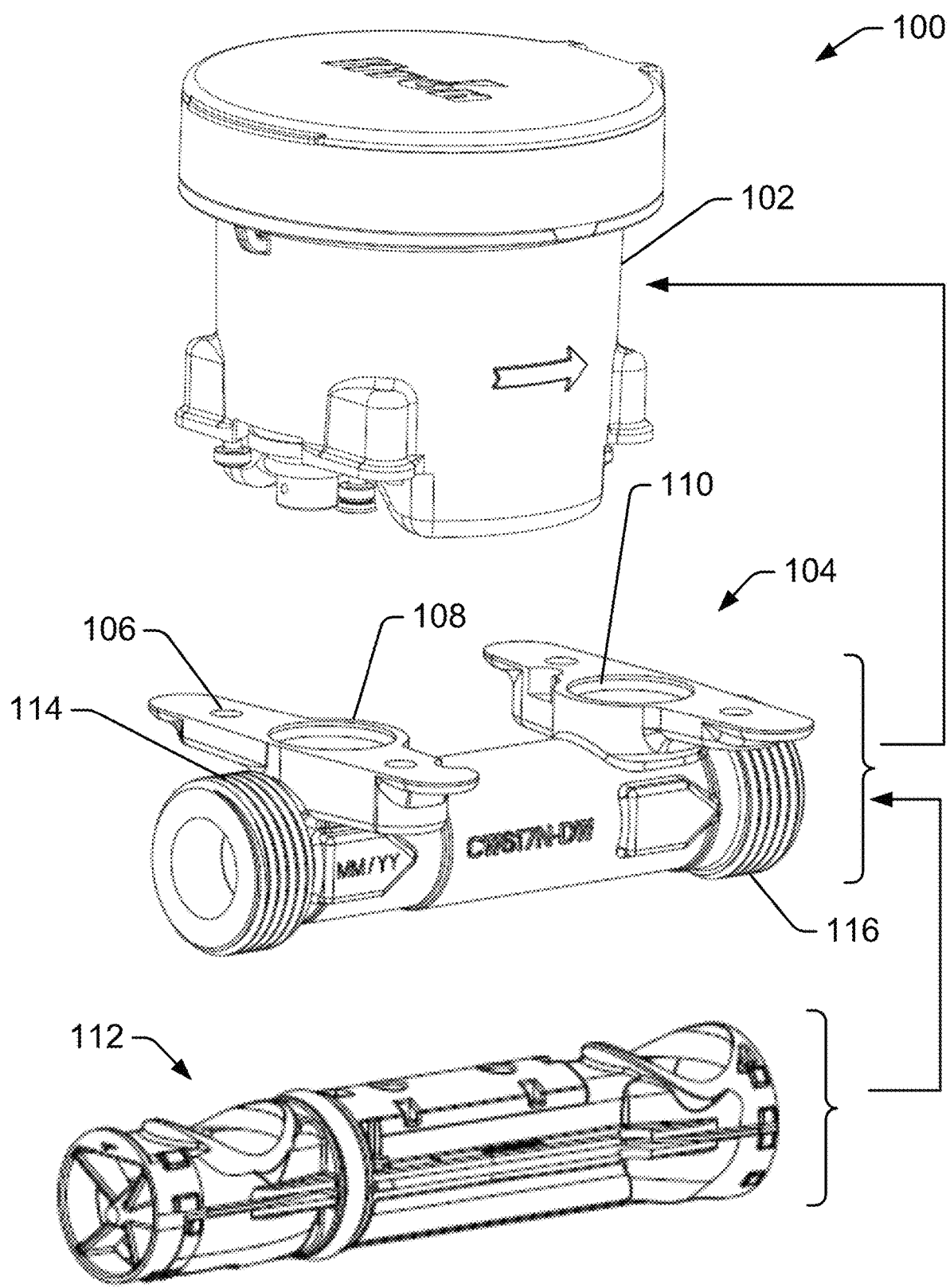
FIG. 1 is a rendering of an example metering device, in a partially exploded view to show the pipe segment and the insert contained within the pipe segment.

A transducer assembly may be configured to send signals between upstream and downstream transducers, and to measure a flowrate as a function of a difference in the upstream and downstream signal time-of-flight. The transducers may be in contact with fluid flowing through a section of pipe. To create better fluid flow characteristics, an insert is installed within the section of pipe. The insert defines an ultrasonic channel that promotes more desirable and/or laminar fluid flow characteristics and more accurate measurement of fluid flowrate and/or volume. The insert may include one or more features to guide fluid (water, gas, etc.) to create a more laminar and/or smooth and predictable flow pattern that results in more accurate fluid flowrate and/or quantity measurements. An example feature of the insert may include optimized mirror supports for low pressure drop and stable flow conditions. In an example, the mirrors (upstream and downstream) may be manufactured using an overmolding process or other techniques to reduce component count in the insert. The mirrors (upstream and downstream) reflect the ultrasonic signals sent between the upstream and downstream piezo transducers. The optimized mirror supports have a shape that conducts fluid in a manner that reduces turbulence and promotes more stable and/or consistent flow conditions. Another example feature of the insert is an optimized curve that transitions the insert between areas of greater and lesser diameter. A further example feature of the insert is a X-cross shape of the blades of the flow stabilizer (e.g., as seen in FIG. 8), that tends to reduce fluid swirl, and to promote smoother and more consistent flow. A rounded conic shape at the center of the blades deflects flow from one or both mirrors and stabilizes the fluid flow Example Insert for Use with Transducers in a Meter Device FIG. 1 shows example components of a fluid meter 100 (e.g., a water meter) in a partially exploded view. A register portion 102 is configured to calculate, record and transmit data concerning consumption of fluid (e.g., water) by a customer (e.g., a residential or commercial customer). A section of pipe 104 can be attached to the register portion with one or more fasteners 106. The section of pipe 104 may be connected to incoming and outgoing pipes at threaded connectors 114, 116. Openings 108, 110 allow upstream and downstream transducers to be positioned to send and receive signals through fluid flowing through the pipe. Processing means (e.g., a microprocessor and software in the register portion 102) may be used to measure signal transmission time and determine a fluid flowrate and/or fluid volume passing through the pipe 104.

An insert 112 is sized and configured to be assembled and located within the pipe 104. The insert 112 is further configured to reduce turbulence in fluid flowing between the transducers. Thus, water flows through the insert, which is within the pipe. The insert functions to smooth the water flow, reducing turbulence and making the water flowrate (e.g., fluid volume over time) easier to measure. The insert 112 produces more desirable conditions for the operation of ultrasonic transducers used to measure water flowrate and/or water quantity and/or factors to derive those values.

FIG. 2A shows a fluid meter 100, including the register portion 102, the section of pipe 104 and the insert 112. In the view shown, the section of pipe 104 is connected to the register portion 102. The insert 112 is installed within the section of pipe 104.

The insert 112 includes a conically shaped center portion 200 which smooths fluid flow around the mirrors and/or mirror supports 202, 204. The mirror supports 202, 204 support the mirrors 210, 212 which reflect ultrasonic signals sent between the upstream transducer 206 and downstream transducer 208. A central mirror 214 may also be used. Accordingly, an ultrasonic signal may make a "W" path through the insert. In particular, the signal goes "down" from the upstream transducer 206 to the mirror 210, up-and-over to the central mirror 214, down-and-over to the downstream mirror 212, and then "up" to the downstream transducer 208. The downstream transducer 208 sends a signal to the upstream transducer 206 using the same path but in the reverse direction.

A feature of the insert that results in more accurate manufacturability and more accurate metrology is the connection between the transducers and the insert. The transducers 206, 208 extend through holes in the insert (e.g., holes 302, 304 of FIG. 3), thereby locking the relative positions (e.g., as seen in FIGS. 2A and 2B) of the transducers and the insert 112.

FIG. 2B shows many of the same elements as FIG. 2A, enlarged for convenience.

FIG. 3 shows an example upper portion 300 of an insert (e.g., to be connected to the example lower portion 400 seen in FIG. 4). The upper portion 300 and the lower portion 400, when assembled together and installed in a pipe (e.g., pipe 104 of FIG. 1) are configured to modify fluid flow within the insert to result in increased accuracy of fluid measurement.

FIG. 4 shows an example lower portion 400 of the insert. In the example shown, an upstream mirror support 202 and a downstream mirror support 204 are shaped and configured to promote low pressure drop and stable flow conditions. The mirror support 202 supports an upstream mirror 210 which, in operation, reflects an ultrasonic signal from a first transducer. The signal is again reflected by a central mirror 214 (seen in FIG. 3) of the upper portion 300 of the insert. The signal is reflected a third time by the downstream mirror 212, thereby directing the to a second transducer.

The upper portion 300 and lower portion 400 may be characterized by an interior shape having an optimized upstream curvature 316 and downstream curvature 318, which directs fluid flow in a manner that promotes less turbulent and more laminar flow.

Fasteners 402, 404, 406 (seen in the lower portion 400 of FIG. 4) connect to a complementary number of holes 306, 308, 310 (seen in the upper portion 300 of FIG. 3). Upon assembly, the fasteners hold the upper portion 300 to the lower portion 400, thereby forming the insert 112 (e.g., as seen in FIG. 1) for installation in the section of pipe 104. Optionally, additional alignment features may be used to guide the upper portion 300 and the lower portion 400 into a proper connection.

Figure 5:
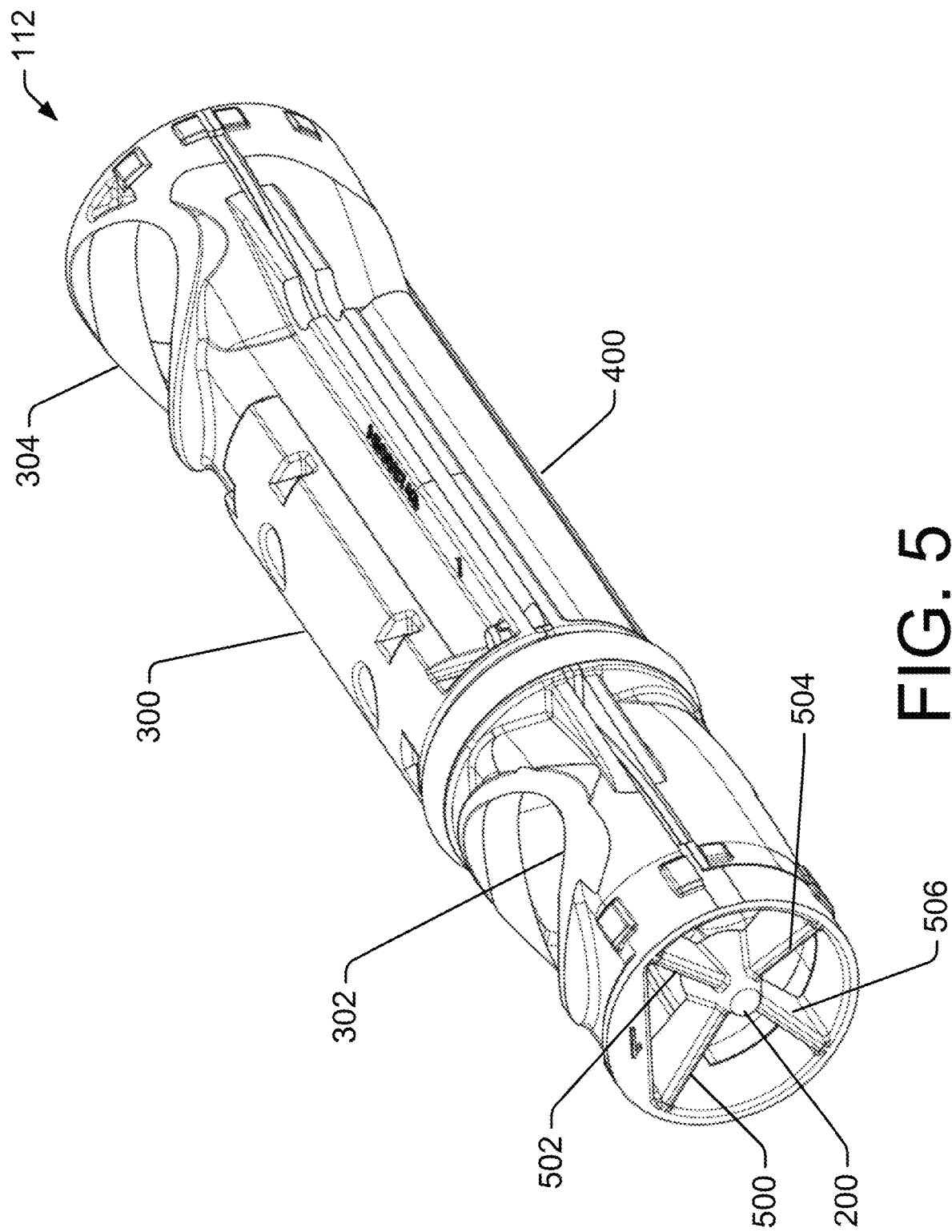
FIG. 5 is a rendering showing an example insert having the upper and lower portions assembled.

FIG. 5 shows an example insert 112 having the upper portion 300 and lower portion 400 fastened together. Two holes 302 and 304 are defined in the upper portion 300. The holes allow respective upstream and downstream transducers to contact the water or other fluid within the insert. Additionally, the holes 302, 304 may form a type of fastener that separates and secures the upstream transducer 206 and downstream transducer 208 in precise locations, orientations, and distance of separation.

A flow stabilizer (also shown as flow stabilizer 800 in FIG. 8) is configured to smooth the flow of fluid. The conically shaped center portion 200 directs a water flow as it enters the central cavity of the insert. Four blades 500, 502, 504, 506 are connected to, and distributed about, the conically shaped center portion 200 at 90-degree intervals. While four blades are shown in the example of FIG. 5, two to six blades may be used. The number of blades used in any particular insert may be selected based upon comparison of two or more designs having different numbers of blades, and the accuracy and reproducibility of fluid measurement of the different designs. The conically shaped center portion 200 and the blades 500-506 tend to straighten the path taken by fluid, thereby reducing swirl or rotating fluid pathways and promoting repeatable and consistent fluid flow.

Figure 6:
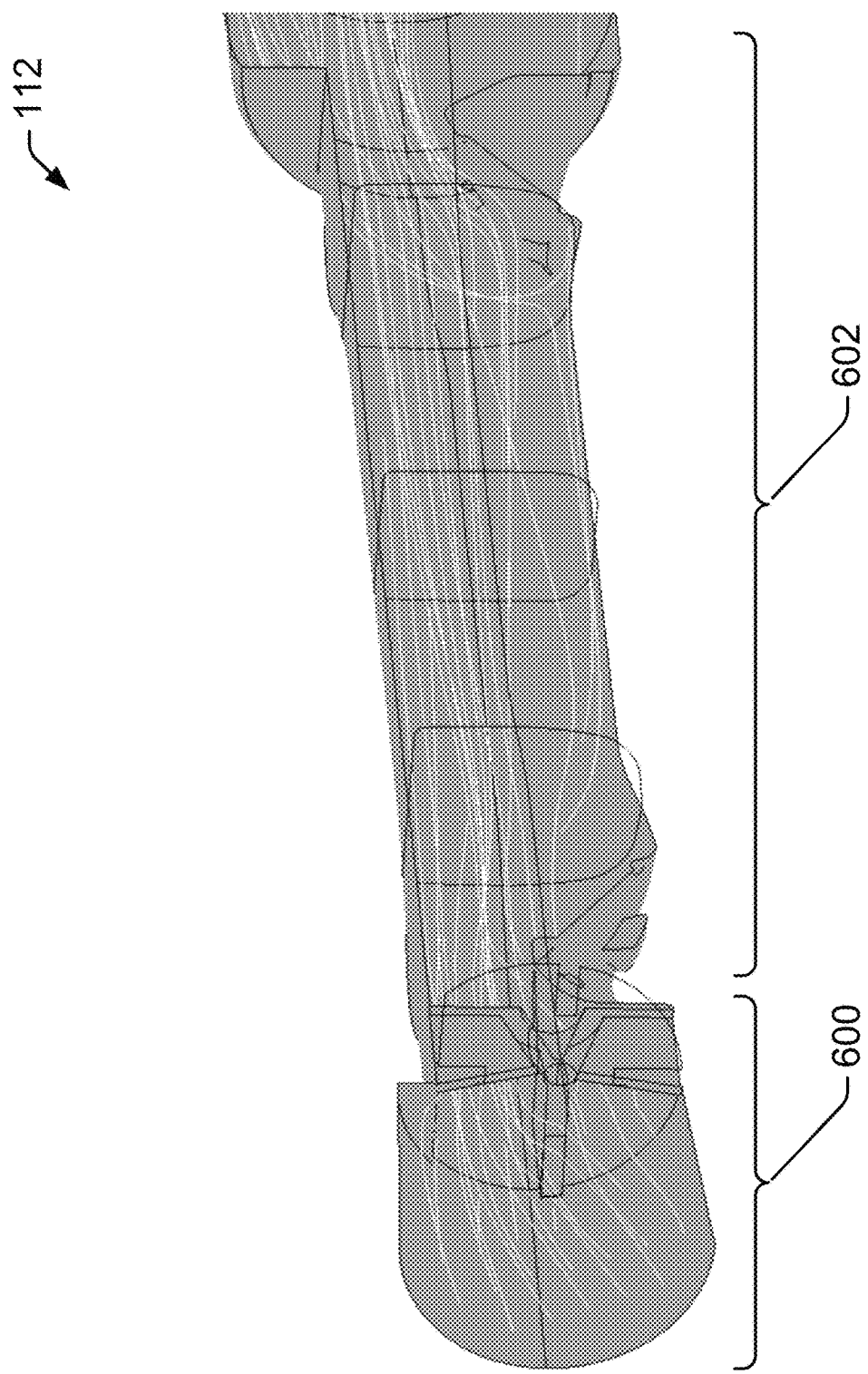
FIG. 6 is a diagram showing fluid flow through an example insert.

FIG. 6 shows example fluid flow through an example insert 112. In particular, the initial flow 600 is more turbulent, while the flow 602 through the middle portion of the insert 112 less turbulent. Moreover, the flowrate through different inserts 112 is more consistent. The conically shaped center portion 200, the blades 500-506, the curvature 316, 318 of the interior of the insert, and the mirror supports 202, 204 all contribute synergistically to result in a more consistent flow through different instances of the insert 112 (as seen in FIGS. 1, 2, 3 and 5).

Figure 7:
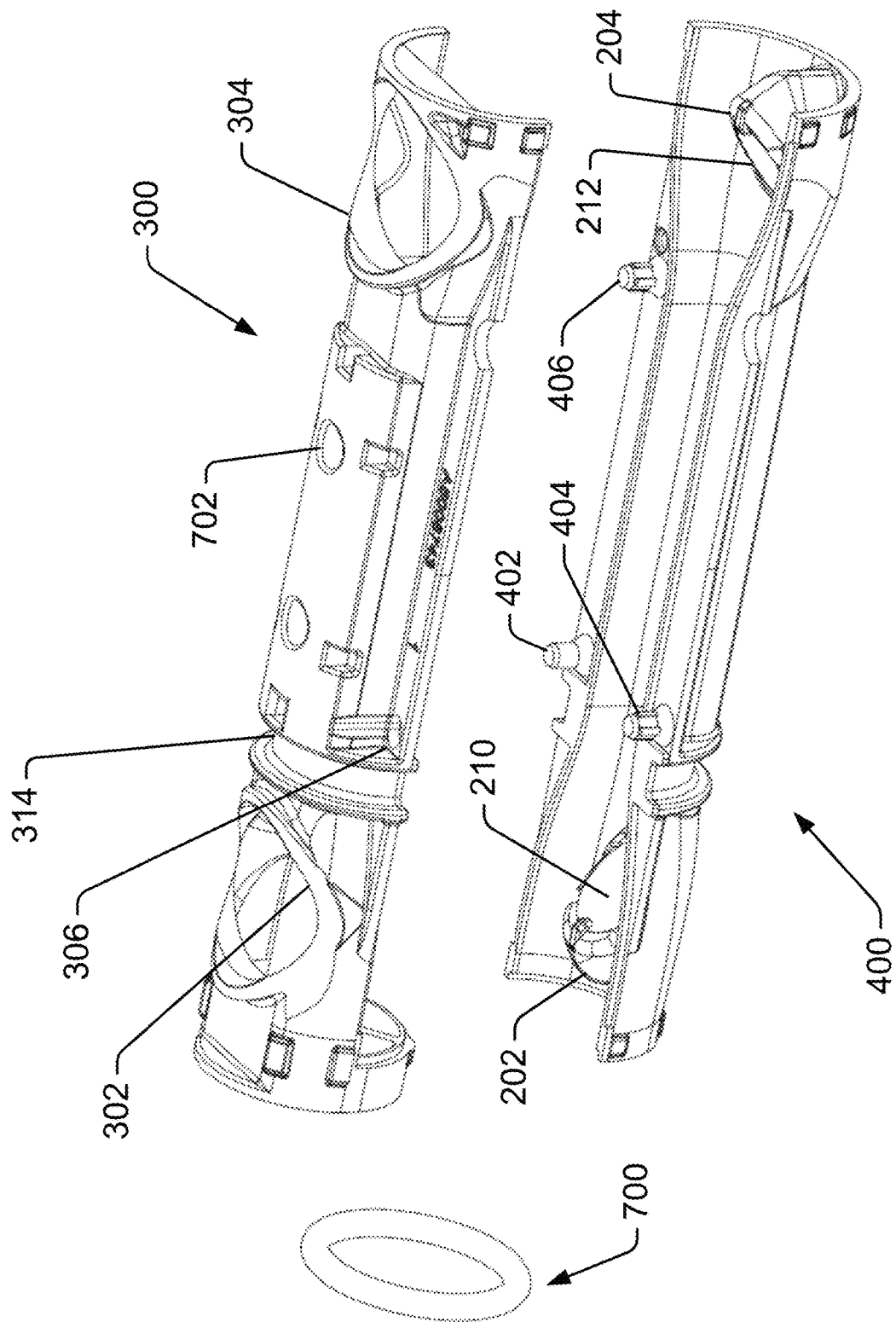
FIG. 7 is a rendering showing an exploded view of an example insert.

FIG. 7 shows an exploded view of an example insert 112. In the example, the upper portion 300 and lower portion 400 of the insert 112 are shown. The upstream hole 302 and downstream hole 304 provide passages through which the respective upstream and downstream transducers are able to contact water flowing through the insert 112. Referring to the examples of FIGS. 2 and 7, the transducers 206, 208 extend through holes in the insert (e.g., holes 302, 304 of FIG. 3), thereby locking the relative positions of the transducers and the insert 112 (e.g., as seen in FIGS. 2A and 2B). While holes are shown in the examples of FIGS. 3 and 7, each hole may be replaced by, or combined with, a sleeve, a fastener, a connector, and/or a device to hold the transducers in precise locations and in a precise relationship (e.g., a precise separation distance) to each other and to the mirrors 210, 212. In an example, the holes 302, 304 secure the transducers in a fixed position, and are therefore examples of connectors and/or fasteners.

The fasteners 402-406 of the lower portion 400 and associated hole or complementary fastener 306-310 (seen in FIG. 3) of the upper portion 300 allow the upper portion 300 and lower portion 400 to be fastened together. Note that while the fasteners and holes have been shown on respective portions, the fasteners are intended only to represent possible fasteners, and the fasteners could be located on either the upper or lower portion.

An O-ring 700 may be installed on the O-ring channel 314 after the upper and lower portions 300, 400 are fastened together.

The upstream and downstream mirror supports 202, 204 divert water flow direction in a manner that promotes less turbulence and more nearly laminar and more consistent flow. The mirror supports 202, 204 have a curved shape, and are located in portions of the insert 112 having a diameter that is larger than a portion of insert in which the central mirror 214 is located. The mirror supports are associated with respective upstream and downstream mirrors 210, 212. The mirrors reflect ultrasonic signals from the upstream transducer to the downstream transducer, and the reverse. In one example, the mirrors are manufactured using an overmolding technique. Using the overmolding technique, the upstream mirror and the downstream mirror are overmolded to a supporting structure. This technique causes the mirrors to be more accurately located than would be the case where separately constructed mirrors were attached to respective mirror supporting structures.

The central mirror 214 is best seen in FIG. 3; however, the back side of the central mirror 214 can be seen through hole 702.

FIG. 8 shows an example flow stabilizer 800 of an insert. In the example, the flow stabilizer 800 is part of the upper portion 300 of the insert, i.e., the flow stabilizer may be molded directly with, and/or as part of, the upper portion. Alternatively, the flow stabilizer could be part of the lower portion 400 (e.g., seen in FIG. 4) of the insert.

In the example, the flow stabilizer 800 includes the rounded conically shaped center portion 200 and the four blades 500-506. The components of the flow stabilizer 800 work synergistically with the mirror supports and the curved inside wall of the insert 112 to result in substantially less flow-turbulence and smoother and more consistent flow when comparing flow characteristics of a plurality of inserts.

In one example, while the opening in the flow stabilizer 800 is generally circular and defined by a ring 802 of molded material, a flat upper edge 804 may be defined.

Figure 9:
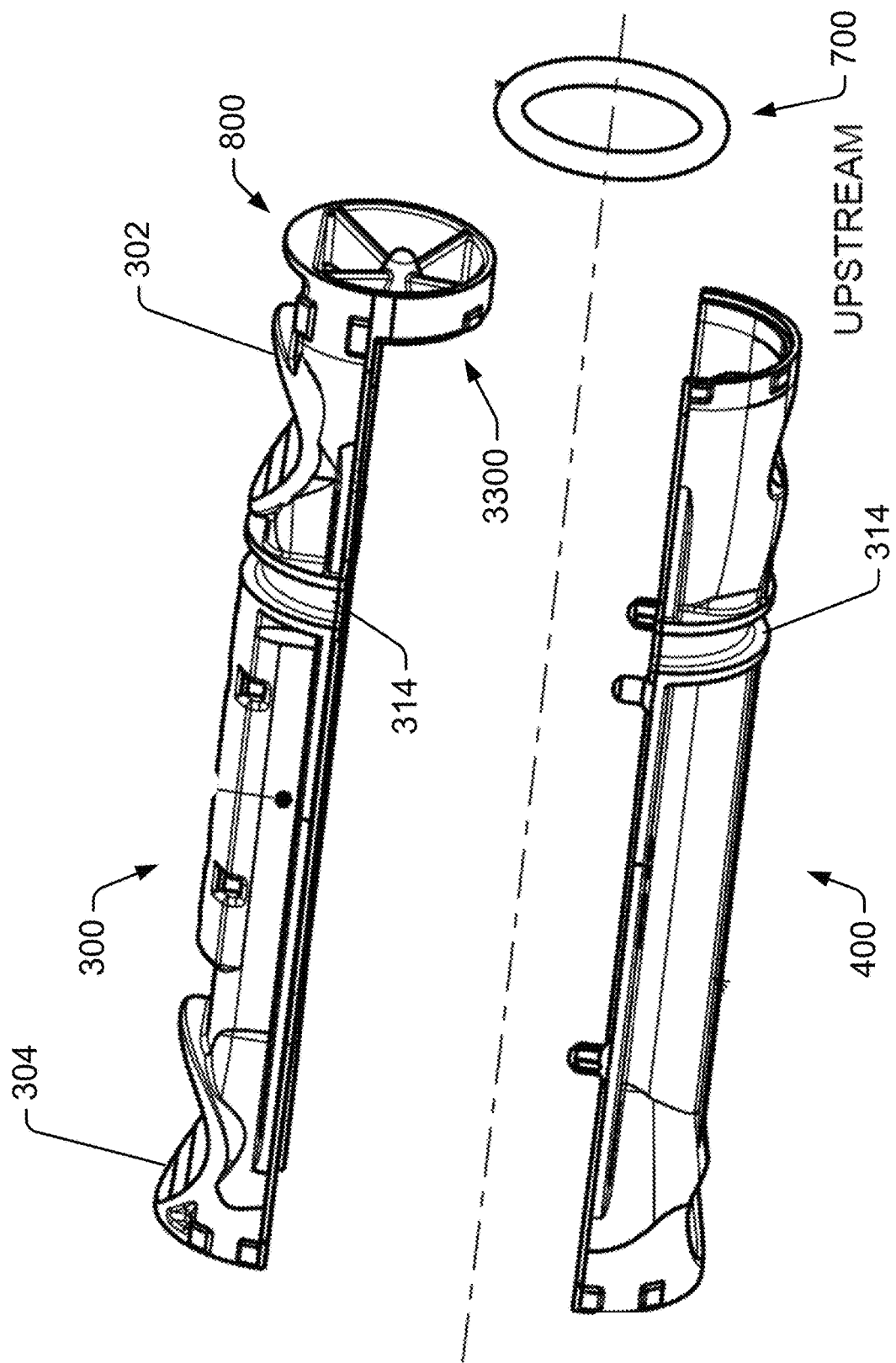
FIG. 9 is a line drawing showing an exploded view of an insert, showing the upper and lower portions and an O-ring.

FIG. 9 shows an exploded view of an insert, showing the upper portion 300 and the lower portion 400. Upon assembly, the O-ring 700 is located in the O-ring channel 314. The O-ring acts as an additional fastener to prevent separation of the upper portion 300 and lower portion 400.

Figure 10:
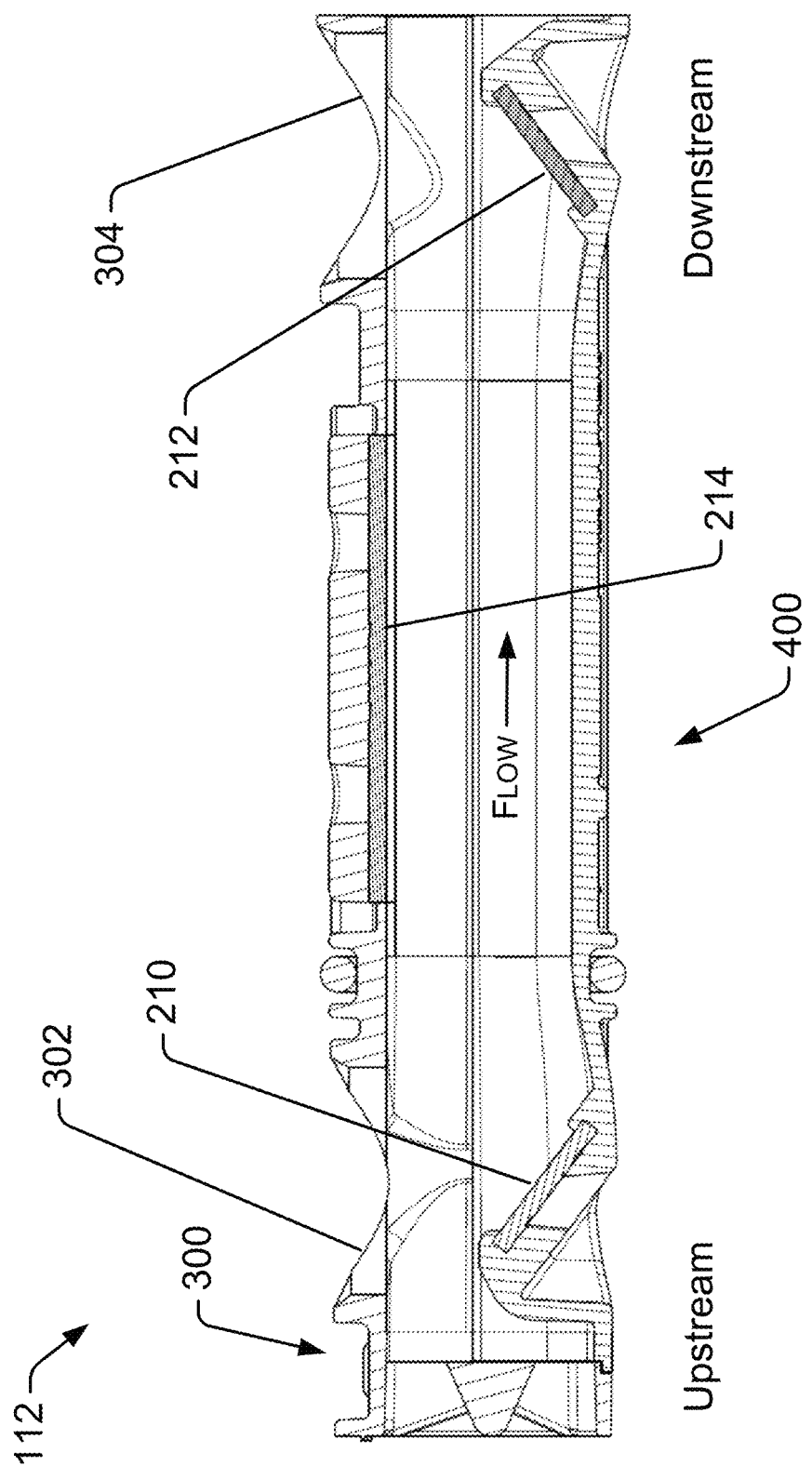
FIG. 10 is a cross-sectional view of an example insert.

FIG. 10 shows a cross-sectional view of an example insert 112. The flow stabilizer 300 is in an upstream portion of the insert. Upstream and downstream openings 302, 304 provide a passage for respective upstream and downstream transducers. A signal from the upstream transducer would be reflected by the upstream mirror 210, the central mirror 214, and the downstream mirror 212 before being received by the downstream transducer. Note that the upstream transducer 206 and downstream transducer 208 are best seen in FIG. 2A.

Example Embodiments of Ultrasonic Channels

In an example insert, the insert comprises: an upper insert portion, comprising: a flow stabilizer, the flow stabilizer comprising: a conically-shaped center portion; four blades connected to the conically-shaped center portion; and a central mirror; and a lower insert portion, comprising: an upstream mirror support having an upstream mirror; and a downstream mirror support having a downstream mirror; wherein: an inside wall of the insert is curved; and the upstream mirror support and the downstream mirror support are located in portions of the insert having a diameter that is larger than a portion of insert in which the central mirror located.

In an example of an insert for a water meter, the insert comprises: an upper insert portion having a central mirror; a lower insert portion, comprising: an upstream mirror support having an upstream mirror; and a downstream mirror support having a downstream mirror; a flow stabilizer, attached as part of one of the upper insert portion or the lower insert portion, the flow stabilizer comprising: a conically-shaped center portion; four blades connected to the conically-shaped center portion; and a central mirror; and wherein: an inside wall of the insert is curved; and the upstream mirror support and the downstream mirror support are located in portions of the insert having a diameter that is larger than a portion of insert in which the central mirror located.

Further Example Embodiments of Ultrasonic Channels

The following examples of an ultrasonic channel are expressed as number clauses. While the examples illustrate a number of possible configurations and techniques, they are not meant to be an exhaustive listing of the systems, methods, and/or techniques described herein.

1. An insert to affect fluid flow in a water meter, comprising: an upper portion of the insert, comprising: a central mirror; a lower portion of the insert, comprising: an upstream mirror; and a downstream mirror; and a flow stabilizer connected to at least one of the upper portion or the lower portion, the flow stabilizer comprising: a conically-shaped center portion; and at least three blades connected to the conically-shaped center portion.

2. The insert of clause 1, wherein: the upper portion and the lower portion are each molded in a single piece; and the upstream mirror and the downstream mirror are overmolded to respective areas of the lower portion of the insert.

3. The insert of clause 1, additionally comprising: an upstream transducer hole defined in the upper portion; and a downstream transducer hole defined in the upper portion; wherein the upstream transducer hole and the downstream transducer hole are adjacent to the upstream mirror and the downstream mirror, respectively.

4. The insert of clause 1, additionally comprising: an upstream transducer fastener defined in the upper portion; and a downstream transducer fastener defined in the upper portion; wherein the upstream transducer fastener and the downstream transducer fastener are located and configured to securely position respective first and second transducers a distance apart from one another.

5. The insert of clause 1, additionally comprising: an O-ring channel defined in both the upper portion and the lower portion; and an O-ring carried within the O-ring channel.

6. The insert of clause 1, wherein: the upstream mirror and the downstream mirror are overmolded to an upstream mirror support and a downstream mirror support, respectively.

7. The insert of clause 1, additionally comprising: an upstream mirror support, supporting the upstream mirror; and a downstream mirror support, supporting the downstream mirror; wherein the upstream mirror support and the downstream mirror support are located in respective first and second portions of the insert having a greater diameter than a central portion of the insert containing the central mirror.

8. The insert of clause 7, wherein: the upstream mirror support has a rounded upstream side; and the downstream mirror support has a rounded downstream side.

9. The insert of clause 1, wherein: the flow stabilizer is molded as part of the upper portion; and the flow stabilizer has four blades connected to the conically-shaped center portion.

10. The insert of clause 1, wherein: the flow stabilizer is part of the upper portion; and the flow stabilizer comprises: a ring of molded material; a rounded point on the conically-shaped center portion; and four blades connected to the conically-shaped center portion and the ring of molded material.

11. A metering device, comprising: an upstream transducer; a downstream transducer; a section of pipe configured to conduct a flow of fluid within the metering device; and an insert, contained within the section of pipe, comprising: an upstream transducer fastener; and a downstream transducer fastener.

12. The metering device of clause 11, wherein: the insert comprises an upper portion and a lower portion; and the upper portion and the lower portion are each molded in a single piece.

13. The metering device of clause 11, additionally comprising: a flow stabilizer molded as part of one of an upper portion of the insert and a lower portion of the insert, wherein the flow stabilizer comprises four blades.

14. The metering device of clause 11, additionally comprising: an upstream mirror and a downstream mirror, each of which are overmolded to portions within the insert.

15. The metering device of clause 11, wherein the upstream transducer fastener and the downstream transducer fastener are sized to securely position respective first and second transducers a distance apart.

16. An insert for a water meter, comprising: an upper insert portion, comprising: a central mirror; a lower insert portion, comprising: an upstream mirror; and a downstream mirror; and a flow stabilizer connected to at least one of the upper insert portion or the lower insert portion; an upstream transducer fastener defined in the upper insert portion; and a downstream transducer fastener defined in the upper insert portion.

17. The insert of clause 16, wherein: the upper insert portion and the flow stabilizer are molded in a single piece; and the lower insert portion is molded in a single piece.

18. The insert of clause 16, wherein: the central mirror, the upstream mirror and the downstream mirror are of overmolded construction.

19. The insert of clause 16, wherein: the flow stabilizer comprises four blades configured to direct water flow through the insert.

20. The insert of clause 16, wherein the upstream transducer fastener and the downstream transducer fastener are located and configured to securely position respective first and second transducers a precise distance apart.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An insert to affect fluid flow in a water meter, comprising:
   an upper portion of the insert, comprising:
      a central mirror;
   a lower portion of the insert, comprising:
      an upstream mirror; and
      a downstream mirror; and
   a flow stabilizer connected to at least one of the upper portion or the lower portion, the flow stabilizer comprising:
      a conically-shaped center portion; and
      at least three blades connected to the conically-shaped center portion;
   wherein:
      the upper portion and the lower portion are each molded in a single piece; and
      the upstream mirror and the downstream mirror are overmolded to respective areas of the lower portion of the insert.

2. The insert of claim 1, additionally comprising:
   an upstream transducer hole defined in the upper portion; and
   a downstream transducer hole defined in the upper portion;
   wherein the upstream transducer hole and the downstream transducer hole are adjacent to the upstream mirror and the downstream mirror, respectively.

3. The insert of claim 1, additionally comprising:
   an upstream transducer opening defined in the upper portion; and
   a downstream transducer opening defined in the upper portion;
   wherein the upstream transducer opening and the downstream transducer opening are located and configured to securely position respective first and second transducers a distance apart from one another.

4. The insert of claim 1, additionally comprising:
   an O-ring channel defined in both the upper portion and the lower portion; and
   an O-ring carried within the O-ring channel.

5. The insert of claim 1, wherein:
   the upstream mirror and the downstream mirror are overmolded to an upstream mirror support and a downstream mirror support, respectively.

6. The insert of claim 1, additionally comprising:
   an upstream mirror support, supporting the upstream mirror; and
   a downstream mirror support, supporting the downstream mirror;
   wherein the upstream mirror support and the downstream mirror support are located in respective first and second portions of the insert having a greater diameter than a central portion of the insert containing the central mirror.

7. The insert of claim 6, wherein:
   the upstream mirror support has a rounded upstream side; and
   the downstream mirror support has a rounded downstream side.

8. The insert of claim 1, wherein:
   the flow stabilizer is molded as part of the upper portion; and
   the flow stabilizer has four blades connected to the conically-shaped center portion.

9. The insert of claim 1, wherein:
   the flow stabilizer is part of the upper portion; and
   the flow stabilizer comprises:
      a ring of molded material;
      a rounded point on the conically-shaped center portion; and
      four blades connected to the conically-shaped center portion and the ring of molded material.

10. A metering device, comprising:
    an upstream transducer;
    a downstream transducer;
    a section of pipe configured to conduct a flow of fluid within the metering device;
    an insert, contained within the section of pipe, comprising:
       an upstream transducer opening to position the upstream transducer; and
       a downstream transducer opening to position the downstream transducer; and
    an upstream mirror and a downstream mirror, each of which are overmolded to portions within the insert.

11. The metering device of claim 10, wherein:
    the insert comprises an upper portion and a lower portion; and
    the upper portion and the lower portion are each molded in a single piece.

12. The metering device of claim 10, additionally comprising:
    a flow stabilizer molded as part of one of an upper portion of the insert and a lower portion of the insert, wherein the flow stabilizer comprises four blades.

13. The metering device of claim 10, wherein the upstream transducer opening and the downstream transducer opening are sized to securely position respective first and second transducers a distance apart.

14. An insert for a water meter, comprising:
    an upper insert portion, comprising:
       a central mirror;
    a lower insert portion, comprising:
       an upstream mirror; and
       a downstream mirror;
    a flow stabilizer connected to at least one of the upper insert portion or the lower insert portion;
    an upstream transducer opening defined in the upper insert portion; and
    a downstream transducer opening defined in the upper insert portion,
    wherein the central mirror, the upstream mirror and the downstream mirror are of overmolded construction.

15. The insert of claim 14, wherein:
    the upper insert portion and the flow stabilizer are molded in a single piece; and
    the lower insert portion is molded in a single piece.

16. The insert of claim 14, wherein:
    the flow stabilizer comprises four blades configured to direct water flow through the insert.

17. The insert of claim 14, wherein the upstream transducer opening and the downstream transducer opening are located and configured to securely position respective first and second transducers a precise distance apart.

* * * * *